United States Patent
Kawamuro et al.

(10) Patent No.: US 11,424,656 B2
(45) Date of Patent: Aug. 23, 2022

(54) MOTOR DEVICE

(71) Applicant: ADVICS CO., LTD., Kariya (JP)

(72) Inventors: Seigo Kawamuro, Kariya (JP); Yuichi Takeo, Aichi-ken (JP)

(73) Assignee: ADVICS CO., LTD., Kariya (JP)

( * ) Notice: Subject to any disclaimer, the term of this patent is extended or adjusted under 35 U.S.C. 154(b) by 501 days.

(21) Appl. No.: 16/604,207

(22) PCT Filed: Apr. 23, 2018

(86) PCT No.: PCT/JP2018/016460
§ 371 (c)(1),
(2) Date: Oct. 10, 2019

(87) PCT Pub. No.: WO2018/199023
PCT Pub. Date: Nov. 1, 2018

(65) Prior Publication Data
US 2020/0036257 A1    Jan. 30, 2020

(30) Foreign Application Priority Data

Apr. 27, 2017  (JP) .............. JP2017-088869

(51) Int. Cl.
*H02K 5/12* (2006.01)
*F16D 65/00* (2006.01)
(Continued)

(52) U.S. Cl.
CPC .......... *H02K 5/12* (2013.01); *F16D 65/0087* (2013.01); *H02K 5/10* (2013.01); *H02K 7/1021* (2013.01); *F16D 2121/24* (2013.01)

(58) Field of Classification Search
CPC ............. B60T 13/746; F16D 2121/24; F16D 65/0087; H02K 5/10; H02K 5/12;
(Continued)

(56) References Cited

U.S. PATENT DOCUMENTS

| 3,704,922 A * | 12/1972 | Kleinschmidt | ....... F16C 27/066 384/582 |
| 2016/0200294 A1* | 7/2016 | Takeo | ................ H02K 7/116 188/156 |
| 2016/0201745 A1* | 7/2016 | Zhang | ................ F16D 65/16 188/156 |

FOREIGN PATENT DOCUMENTS

| EP | 0639302 B1 * | 6/1998 |
| JP | 2015044424 A | 3/2015 |

(Continued)

OTHER PUBLICATIONS

International Search Report (PCT/ISA/210) dated Jul. 17, 2018, by the Japan Patent Office as the International Searching Authority for International Application No. PCT/JP2018/016460.
(Continued)

*Primary Examiner* — Naishadh N Desai
(74) *Attorney, Agent, or Firm* — Buchanan Ingersoll & Rooney PC

(57) ABSTRACT

This motor device is provided with, e.g.: a motor having a motor case and a shaft supported by the motor case so as to be capable of rotating about a rotation center; a housing in which the motor is housed; and an elastic member interposed between the motor case and the housing. A first concave part in communication with both sides of the elastic member in the axial direction is provided between the outer peripheral surface of the elastic member and a cylindrical surface of the housing.

20 Claims, 6 Drawing Sheets

(51) Int. Cl.
  *H02K 5/10* (2006.01)
  *H02K 7/102* (2006.01)
  *F16D 121/24* (2012.01)

(58) Field of Classification Search
  CPC ........ H02K 5/24; H02K 7/102; H02K 7/1021; H02K 7/116
  See application file for complete search history.

(56) References Cited

FOREIGN PATENT DOCUMENTS

| | | | |
|---|---|---|---|
| JP | 2016145030 A | 8/2016 | |
| WO | WO-2018198671 A1 * | 11/2018 | ............. B24B 23/02 |

OTHER PUBLICATIONS

Written Opinion (PCT/ISA/237) dated Jul. 17, 2018, by the Japan Patent Office as the International Searching Authority for International Application No. PCT/JP2018/016460.

* cited by examiner

MOTOR DEVICE

TECHNICAL FIELD

The present invention relates to a motor device.

BACKGROUND ART

Conventionally, a motor device is known, which includes a housing, a motor housed in the housing to be positioned between a pair of inner surfaces of the housing, and an annular elastic member mounted on a protrusion portion provided on the motor and interposed between one inner surface of the housing and the motor to urge the motor toward the other inner surface of the housing (e.g., PTL 1). For the motor device of this type, for example, an airtightness test is likely to be performed, which is intended to check airtightness of the housing by sucking out air in the housing within a prescribed test time.

CITATION LIST

Patent Literature

PTL 1: JP-A-2016-145030

SUMMARY OF INVENTION

Technical Problems

However, in the conventional motor device, the entire periphery of an outer peripheral surface of the elastic member is in contact with the housing. Accordingly, air which is stagnated between a side of the elastic member opposite to the motor and the housing dose not flow easily. As a result, it takes time to suck out air, which is likely to reduce a work efficiency of the airtightness test.

Accordingly, one of objects of the present invention is, for example, to obtain a motor device having a new configuration to achieve enhancement of flowability of air between the outer peripheral surface of the elastic member and the housing.

Solutions to Problems

A motor device according to the present invention includes, for example, a motor having a motor case and a shaft supported by the motor case to be rotatable about a rotation center; a housing that houses the motor; and an elastic member interposed between the motor case and the housing, wherein the motor case has a first outer surface, a second outer surface positioned to be spaced from the first outer surface in an axial direction of the rotation center, and a protrusion portion provided on the second outer surface, wherein the housing has a first inner surface facing the first outer surface, a second inner surface facing the second outer surface, and a cylindrical surface provided between the first inner surface and the second inner surface and configured to surround the motor case, wherein the elastic member has a cylindrical inner peripheral surface configured to allow the protrusion portion of the motor to be fitted therein and thus to come in contact therewith, a cylindrical outer peripheral portion configured to be in contact with the cylindrical surface, a first surface provided to extend from the inner peripheral surface to the outer peripheral surface and configured to be in contact with the second outer surface, and a second surface provided to extend from the inner peripheral surface to the outer peripheral surface and configured to be in contact with the second inner surface, and the elastic member is configured to urge the motor case toward the first inner surface, wherein a first concave portion is provided between the outer peripheral surface and the cylindrical surface to lead to opposing sides of the elastic member in the axial direction of the rotation center.

In the motor device, the first concave portion is provided between the outer peripheral surface of the elastic member and the cylindrical surface of the housing to lead to opposing sides of the elastic member in the axial direction of the rotation center. Therefore, according to this configuration, for example, air can pass between the outer peripheral surface of the elastic member and the cylindrical surface of the housing by passing through the first concave portion, thereby enhancing flowability of air between the outer peripheral surface of the elastic member and the housing.

DESCRIPTION OF EMBODIMENTS

Hereinafter, exemplary embodiments of the present invention are disclosed. Configurations of embodiments and thus the operation and results (effects) obtained from the configurations as described below are only examples. The present invention can also be implemented with configurations other than configurations disclosed in the following embodiments. Further, according to the present invention, it is possible to obtain at least one of various effects (including derivative effects) obtained by the configurations. Meanwhile, ordinal numbers as used herein are intended to be assigned for the sake of convenience in order to distinguish members (components), sites or the like, not to indicate priority or order.

In each of figures, directions are indicated. A direction X, a direction Y and a direction Z intersect with (perpendicular to) each other. The direction Z is an axial direction of a rotation center Ax1 of a motor 20, and the direction X and the direction Z intersect with (perpendicular to) the direction Z.

Figure 1:
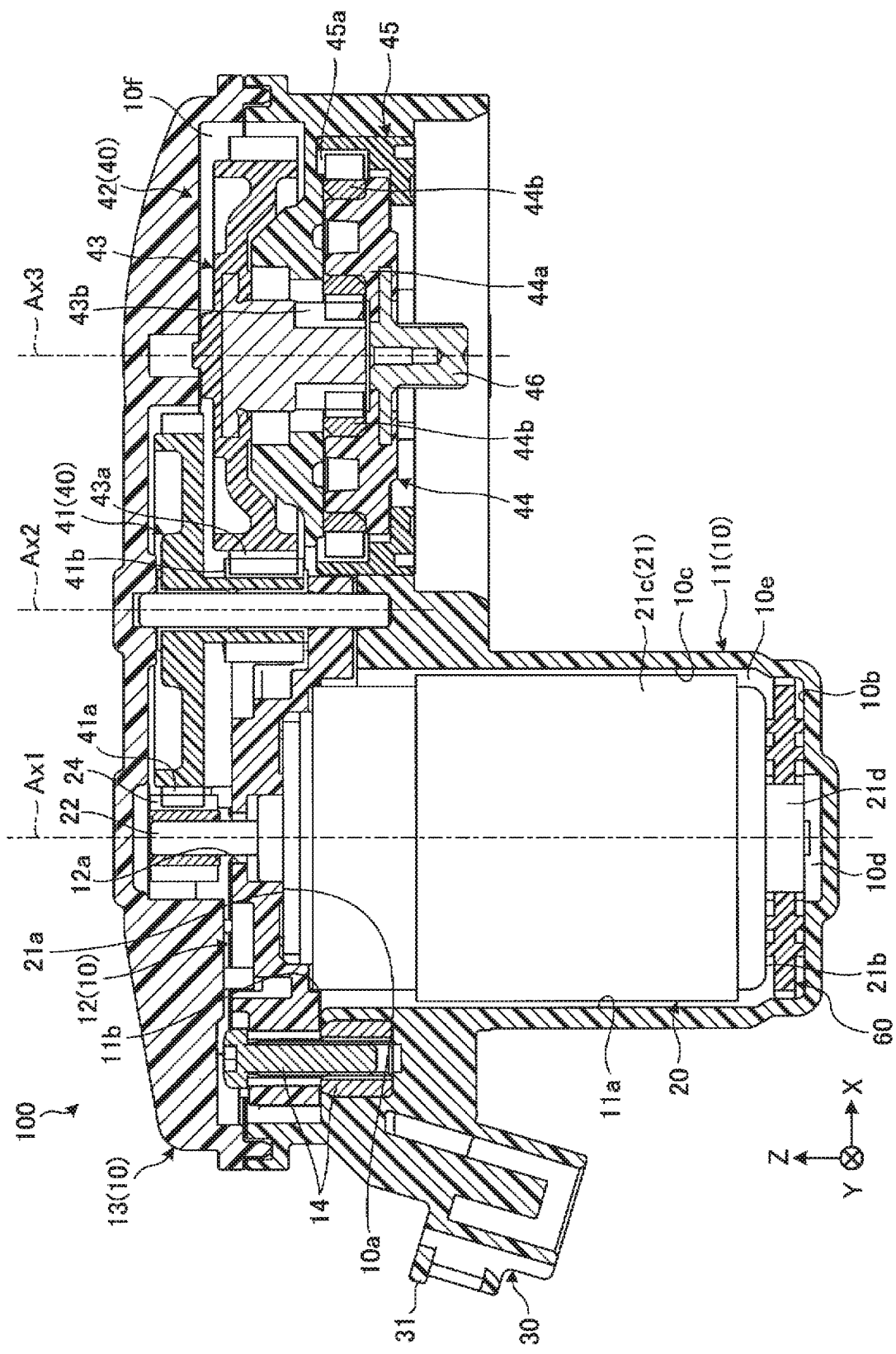
FIG. 1 is a schematic and exemplary sectional view of an electric-powered brake motor unit for according to an embodiment.

FIG. 1 is a sectional view of an electric-powered brake motor unit 100 for a vehicle brake. As shown in FIG. 1, the electric-powered brake motor unit 100 includes a housing 10, a motor 20, a connector 30 and a reduction mechanism 40. The electric-powered brake motor unit 100 is one example of a motor device.

The motor 20 is housed in the housing 10. The motor 20 has a motor case 21 and a shaft 22. The shaft 22 protrudes from a Z-direction end portion of the motor case 21. The shaft 22 is supported by the motor case 21 to be rotatable about the rotation center Ax1. Also, the motor case 21 has a first outer surface 21a, a second outer surface 21b and an outer peripheral surface 21c. The first outer surface 21a is provided on the Z-direction end portion of the motor case 21 and is configured to extend in a direction intersecting with the axial direction of the rotation center Ax1. Also, the second outer surface 21b is provided on an opposing Z-direction end portion of the motor case 21 and is configured to extend in a direction intersecting with the axial direction of the rotation center Ax1. The second outer surface 21b is positioned to be spaced from the first outer surface 21a in the axial direction of the rotation center Ax1. The second outer surface 21b is provided with a protrusion portion 21d. The protrusion portion 21d is configured to have a cylindrical shape about the rotation center Ax1. The motor case 21 is also referred to as a body.

The connector 30 is provided on the housing 10. The connector 30 has a connector housing 31 and a connector terminal (not shown). In the present embodiment, as one example, the connector housing 31 constitutes a part of the housing 10 and is integrally molded with the housing 10. The connector terminal is integrally molded with the connector housing 31 by insert-molding. The connector terminal is electrically connected to a motor terminal (not shown) of the motor 20 via a bus bar (not shown) in order to supply electric power from a battery (not shown) to the motor 20.

The reduction mechanism 40 is housed in the housing 10 and supported by the housing 10. The reduction mechanism 40 is configured to reduce rotation of the motor 20. The reduction mechanism 40 includes a first gear 41 and a planetary gear mechanism 42.

The first gear 41 is provided to be rotatable about a rotation center Ax2 parallel to the rotation center Ax1 and has an input gear 41a and an output gear 41b. The input gear 41a meshes with a pinion 24 fixed on the shaft 22 of the motor 20. The output gear 41b is configured to drive the planetary gear mechanism 42. The number of teeth of the output gear 41b is smaller than the number of teeth of the input gear 41a. Therefore, rotation of the motor 20 is reduced by the first gear 41.

The planetary gear mechanism 42 has a sun gear 43, a planetary carrier 44 and a ring gear 45. The sun gear 43 and the planetary carrier 44 are configured to rotate about a rotation center Ax3 parallel to the rotation centers Ax1, Ax2. The ring gear 45 is fixed on a casing 11 included in the housing 10. The sun gear 43 has an input gear 43a and an output gear 43b. The input gear 43a meshes with the output gear 41b of the first gear 41. The output gear 43b is configured to drive the planetary carrier 44. The planetary carrier 44 has a support portion 44a and a plurality of planetary pinions 44b rotationally supported by the support portion 44a. The ring gear 45 has an inner gear 45a. The center of the inner gear 45a coincides with the rotation center Ax3. The planetary pinions 44b mesh with the output gear 43b of the sun gear 43 at an inward side thereof in a radial direction about the rotation center Ax3 and also mesh with the inner gear 45a of the ring gear 45 at an outward side thereof in the radial direction about the rotation center Ax3. The planetary pinions 44b revolve around the sun gear 43. The support portion 44a of the planetary carrier 44 is provided with an output shaft 46. Rotation of the first gear 41 is reduced by the planetary gear mechanism 42 and then is outputted through the output shaft 46. The output shaft 46 is configured to rotate a rotation part of a rotation-to-linear motion conversion mechanism (not shown). The rotation-to-linear motion conversion mechanism is configured to convert rotation of the output shaft 46 to linear motion of a member for moving a brake pad (not shown).

The housing 10 is provided with a motor housing chamber 10e for housing the motor 20 therein and a reduction mechanism housing chamber 10f for housing the reduction mechanism 40 therein.

The housing 10 has a first inner surface 10a, a second inner surface 10b and a cylindrical surface 10c, of which each face the motor housing chamber 10e. That is, the motor housing chamber 10e is surrounded by the first inner surface 10a, the second inner surface 10b and the cylindrical surface 10c. The first inner surface 10a and the second inner surface 10b are positioned to be spaced from each other in the axial direction of the rotation center Ax1. The first inner surface 10a faces the first outer surface 21a of the motor 20. Also, the second inner surface 10b faces the second outer surface 21b of the motor 20. Further, the second inner surface 10b is provided with a recessed portion 10d. The cylindrical surface 10c is provided between the first inner surface 10a and the second inner surface 10b and surrounds the outer peripheral surface 21c and the protrusion portion 21d of the motor case 21.

The housing 10 is constructed by a combination of a plurality of members. Specifically, the housing 10 includes the casing 11, an inner cover 12 and an outer cover 13.

The casing 11 includes the connector housing 31. Also, a least a part of the motor housing chamber 10e is provided in the casing 11. Further, the casing 11 has the second inner surface 10b and a housing portion 11a, which includes at least a part of the cylindrical surface 10c. The housing portion 11a is configured in the form of a bottomed cylinder. The motor 20 is housed in the housing portion 11a in a posture where the shaft 22 is exposed through an opening end 11b of the housing portion 11a. Further, the casing 11 supports the reduction mechanism 40. The casing 11 is formed of an insulating synthetic resin material.

The inner cover 12 includes the first inner surface 10a and covers the motor 20 at the side thereof opposite to the casing 11. Also, the inner cover 12 covers the opening end 11b of the housing portion 11a. The inner cover 12 is provided with a through hole 12a, and the shaft 22 of the motor 20 extends through the through hole 12a to be exposed on a side opposite to the motor case 21, i.e., on the side of the inner cover 12 opposite to the motor housing chamber 10e. The inner cover 12 extends in a direction intersecting with (perpendicular to) the rotation center Ax1. The inner cover 12 is coupled to the casing 11 by fasteners 14, such as screws. The motor case 21 of the motor 20 is covered by the casing 11 and the inner cover 12. The inner cover 12 is mounted on the motor 20. The inner cover 12 is formed of an insulating synthetic resin material. The inner cover 12 is also referred to as a bracket.

The outer cover 13 covers the inner cover 12, the shaft 22 of the motor 20, the pinion 24, the bus bar, the first gear 41 and the sun gear 43. An outer peripheral portion of the outer cover 13 is joined to an outer peripheral portion of the casing 11 by, for example, welding or the like. The outer cover 13 is formed of an insulating synthetic resin material.

Figure 2:
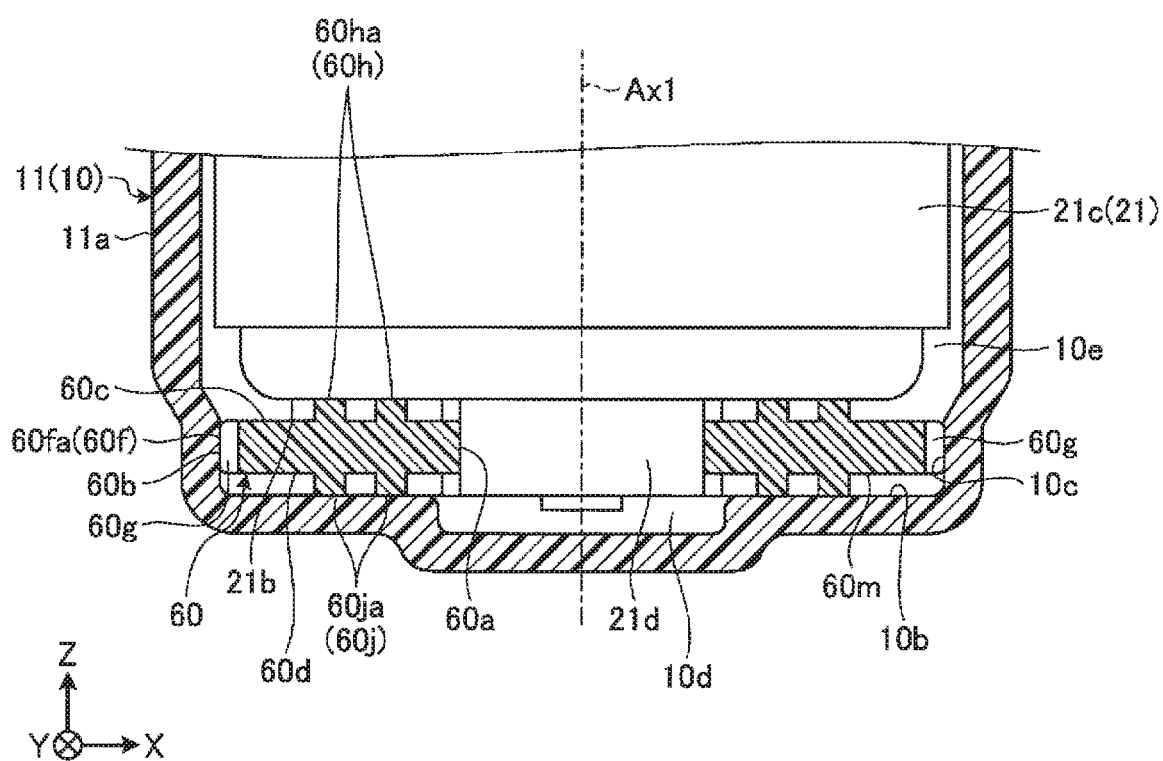
FIG. 2 is a schematic and exemplary sectional view of a part of the electric-powered brake motor unit according to the embodiment.
Figure 3:
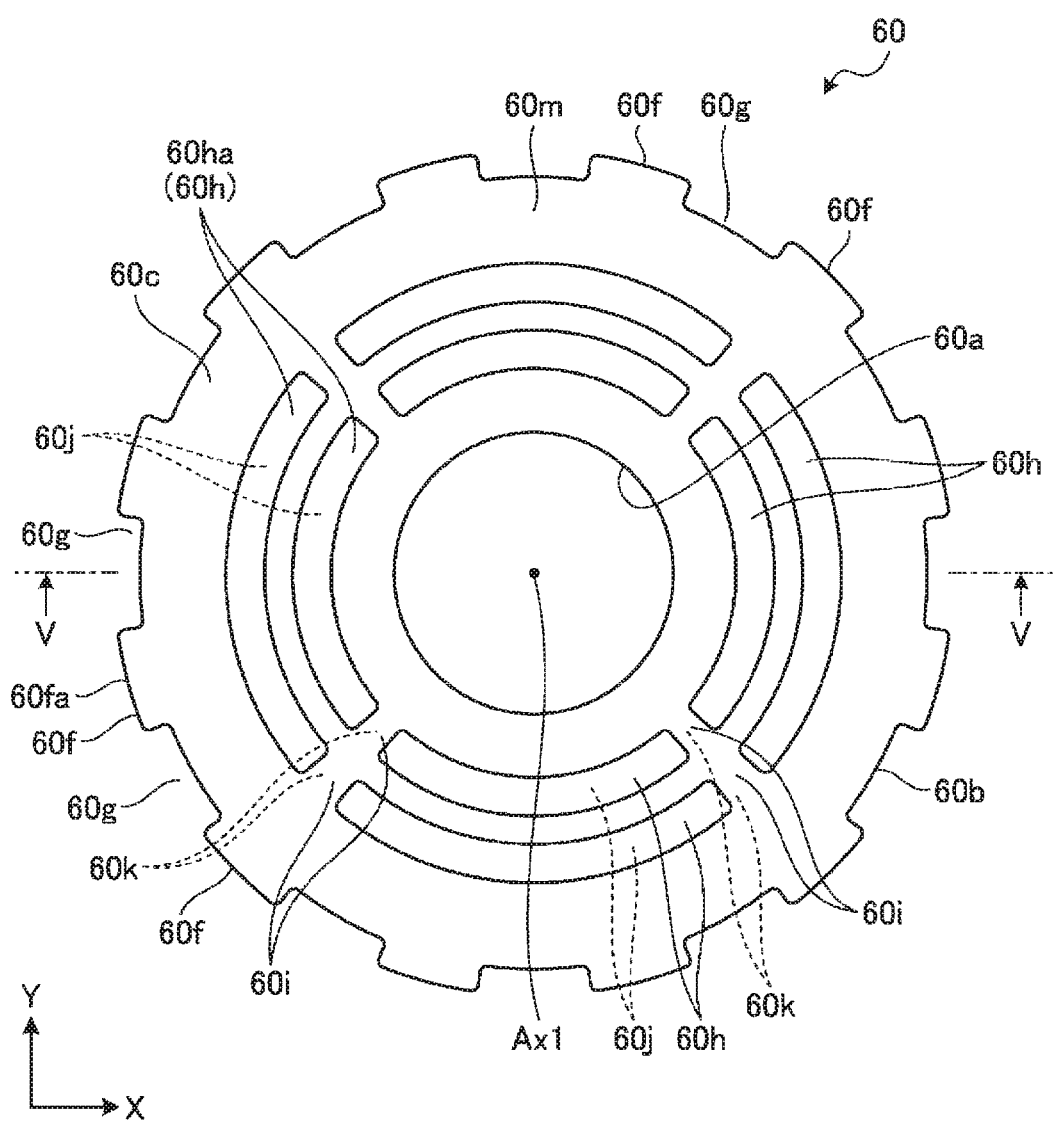
FIG. 3 is a schematic and exemplary plan view of an elastic member of the electric-powered brake motor unit according to the embodiment.

FIG. 2 is a schematic and exemplary sectional view of a part of the electric-powered brake motor unit 100. FIG. 3 is a schematic and exemplary plan view of an elastic member

Figure 4:
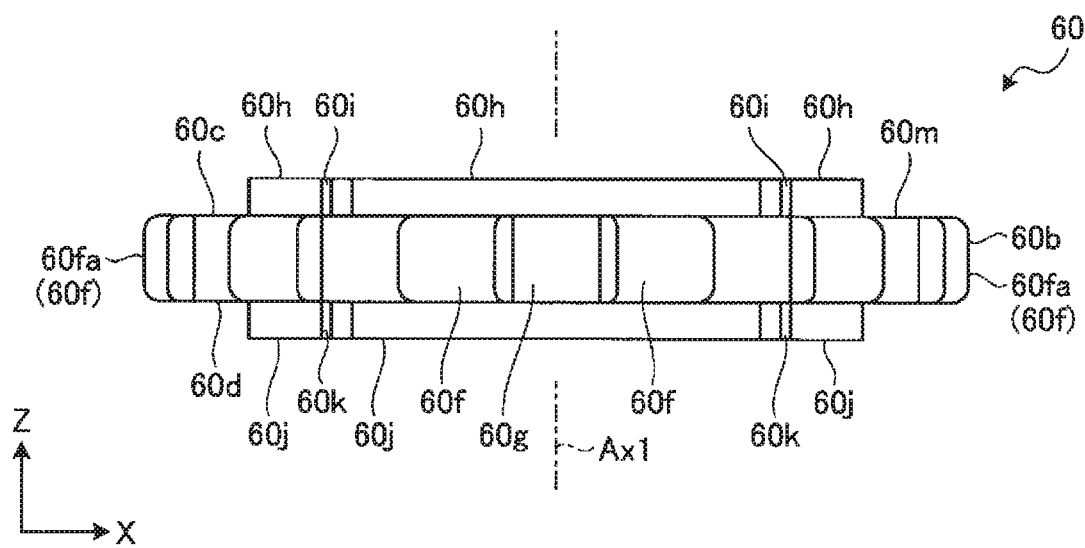
FIG. 4 is a schematic and exemplary side view of the elastic member of the electric-powered brake motor unit according to the embodiment.
Figure 5:
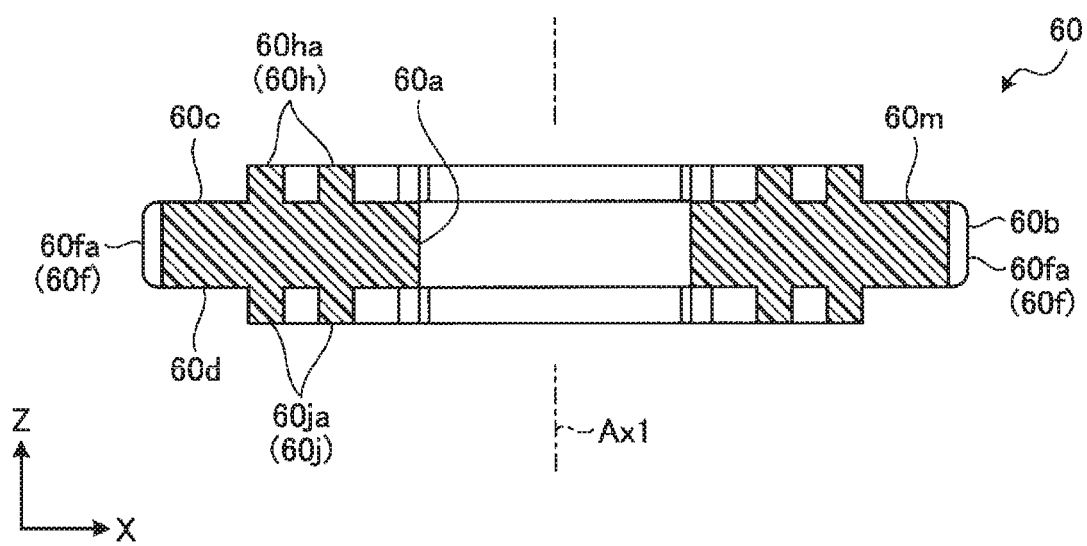
FIG. 5 is a sectional view taken along a line V-V in FIG. 3.

60. FIG. 4 is a schematic and exemplary side view of the elastic member 60. FIG. 5 is a sectional view taken along a line V-V in FIG. 3.

As shown in FIG. 2, the elastic member 60 is interposed between a bottom portion of the housing portion 11*a* of the casing 11 and the motor case 21 of the motor 20. The elastic member 60 is configured to be mounted on the protrusion portion 21*d* of the motor case 21 and to urge the motor case 21 toward the first inner surface 10*a*. The elastic member 60 is formed of, for example, elastomer and thus is elastically deformable.

As shown in FIGS. 3 to 5, the elastic member 60 is configured in the form of a generally circular ring. The elastic member 60 has an inner peripheral surface 60*a*, an outer peripheral surface 60*b*, a first surface 60*c* and a second surface 60*d*. The first surface 60*c* and the second surface 60*d* are also referred to as an end surface. The first surface 60*c* and the second surface 60*d* are one example of a contact surface.

The inner peripheral surface 60*a* is configured to have a cylindrical shape about the rotation center Ax1. The protrusion portion 21*d* of the motor case 21 is fitted into the inner peripheral surface 60*a*, so that the inner peripheral surface 60*a* comes in contact with the protrusion portion 21*d*. Specifically, the inner peripheral surface 60*a* is in contact with the protrusion portion 21*d* over the entire periphery of the inner peripheral surface 60*a*. In the present embodiment, the protrusion portion 21*d* is press-fitted into the inner peripheral surface 60*a*, so that the inner peripheral surface 60*a* comes in close contact with the protrusion portion 21*d*. The inner peripheral surface 60*a* is configured to limit movement of the motor 20 in the radial direction about the rotation center Ax1.

The outer peripheral surface 60*b* is configured to have a cylindrical shape about the rotation center Ax1. The outer peripheral surface 60*b* is in contact with the cylindrical surface 10*c* of the housing 10. Specifically, the outer peripheral surface 60*b* is provided with a plurality of convex portions 60*f*, and top portions 60*fa* (a top surfaces) of the convex portions 60*f* are in contact with the cylindrical surface 10*c*. The plurality of convex portions 60*f* are provided to be spaced from each other in a circumferential direction about the rotation center Ax1. The convex portions 60*f* are configured to protrude outwardly in the radial direction about the rotation center Ax1. A concave portion 60*g* (opening portion) is provided between respective two convex portions 60*f* adjacent to each other in a circumferential direction of the outer peripheral surface 60*b* (the circumferential direction about the rotation center Ax1). That is, the concave portion 60*g* is provided between the outer peripheral surface 60*b* and the cylindrical surface 10*c*. In the present embodiment, a plurality of concave portions 60*g* are positioned to be spaced from each other in the circumferential direction of the outer peripheral surface 60*b*. In other words, the plurality of concave portions 60*g* are intermittently provided. The concave portions 60*g* are configured to be recessed inwardly in the radial direction about the rotation center Ax1. Also, the concave portions 60*g* open to the first surface 60*c* and also to the second surface 60*d*. That is, the concave portions 60*g* lead to the first surface 60*c* and the second surface 60*d* of the elastic member 60. The concave portions 60*g* are one example of a first concave portion. The concave portions 60*g* are also referred to as a ventilation path.

As shown in FIGS. 2, 4 and 5, the first surface 60*c* is provided to extend from a Z-direction end portion of the inner peripheral surface 60*a* to a Z-direction end portion of the outer peripheral surface 60*b*, and the first surface 60*c* is configured to face the second outer surface 21*b* of the motor 20. Also, the first surface 60*c* is in contact with the second outer surface 21*b* of the motor 20. Specifically, the first surface 60*c* is provided with a plurality of convex portions 60*h*, and top portions 60*ha* of the convex portions 60*h* are in contact with the second outer surface 21*b*.

As shown in FIG. 3, the plurality of convex portions 60*h* are configured to be arranged side by side in a plurality of rows along a row direction, which corresponds to the circumferential direction about the rotation center Ax1. A plurality of convex portions 60*h* in each of the rows are positioned to be spaced from each other in the circumferential direction of the outer peripheral surface 60*b*. The convex portions 60*h* are configured to protrude toward the second outer surface 21*b* of the motor case 21. Also, the convex portions 60*h* extend along the circumferential direction of the outer peripheral surface 60*b*.

A concave portion 60*i* (opening portion) is provided between respective two convex portions 60*h* adjacent to each other in the circumferential direction of the outer peripheral surface 60*b* (the circumferential direction about the rotation center Ax1). That is, the concave portion 60*i* is provided between the first surface 60*c* and the second outer surface 21*b* of the motor 20. In the present embodiment, for each of the rows of convex portions 60*h*, a plurality of concave portions 60*i* are positioned to be spaced from each other in the circumferential direction of the outer peripheral surface 60*b*. Also, the rows of convex portions 60*h* are arranged such that respective concave portions 60*i* are arranged side by side in the radial direction about the rotation center Ax1. As a result, in the present embodiment, a plurality of concave portions 60*i* are positioned to be spaced from each other in the radial direction about the rotation center Ax1. The concave portions 60*i* are configured to be recessed toward the second surface 60*d*. Also, the concave portions 60*i* open to a surface of the convex portions 60*h*, which is oriented inwardly in the radial direction about the rotation center Ax1, and also to a surface of the convex portions 60*h*, which is oriented outwardly in the radial direction about the rotation center Ax1. That is, the concave portions 60*i* lead to the side of the inner peripheral surface 60*a* and the side of the outer peripheral surface 60*b* of the elastic member 60. The concave portions 60*i* are one example of a second concave portion. The concave portions 60*i* are also referred to as a ventilation path.

As shown in FIGS. 2, 4 and 5, the second surface 60*d* is provided to extend from an opposing Z-direction end portion of the inner peripheral surface 60*a* to an opposing Z-direction end portion of the outer peripheral surface 60*b* and is configured to face the second inner surface 10*b* of the housing 10. Also, the second surface 60*d* is in contact with the second inner surface 10*b* of the housing 10. Specifically, the second surface 60*d* is provided with a plurality of convex portions 60*j*, and top portions 60*ja* of the convex portions 60*j* are in contact with the second inner surface 10*b*.

Like the plurality of convex portions 60*h*, the plurality of convex portions 60*j* are configured to be arranged side by side in a plurality of rows along a row direction, which corresponds to the circumferential direction about the rotation center Ax1. A plurality of convex portions 60*j* in each of the rows are positioned to be spaced from each other in the circumferential direction of the outer peripheral surface 60*b*. The convex portions 60*j* are configured to protrude toward the second inner surface 10*b* of the housing 10. Also, the convex portions 60*j* extend along the circumferential direction of the outer peripheral surface 60*b*.

A concave portion 60k (opening portion, see FIG. 4) is provided between respective two convex portions 60j adjacent to each other in the circumferential direction of the outer peripheral surface 60b (the circumferential direction about the rotation center Ax1). That is, the concave portion 60k is provided between the second surface 60d and the second inner surface 10b of the housing 10. In the present embodiment, for each of the rows of convex portions 60j, a plurality of concave portions 60k are positioned to be spaced from each other in the circumferential direction of the outer peripheral surface 60b. Also, the rows of convex portions 60j are arranged such that respective concave portions 60k are arranged side by side in the radial direction about the rotation center Ax1. As a result, in the present embodiment, a plurality of concave portions 60k are positioned to be spaced from each other in the radial direction about the rotation center Ax1. The concave portions 60k are configured to be recessed toward the first surface 60c. Also, the concave portions 60k open to a surface of the convex portions 60j, which is oriented inwardly in the radial direction about the rotation center Ax1, and also to a surface of the convex portions 60j, which is oriented outwardly in the radial direction about the rotation center Ax1. That is, the concave portions 60k lead to the side of the inner peripheral surface 60a and the side of the outer peripheral surface 60b of the elastic member 60. The concave portions 60k are one example of the second concave portion. The concave portions 60k are also referred to as a ventilation path.

Further, as shown in FIG. 3, in the present embodiment, the concave portions 60g are positioned to be offset from the concave portions 60i, 60k in the circumferential direction of the outer peripheral surface 60b, as viewed in the axial direction about the rotation center Ax1.

Also, the elastic member 60 has a base portion 60m. The base portion 60m is constructed by apart of the elastic member 60 other than the convex portions 60f, 60h, 60j. That is, the base portion 60m is configured in the form of a circular ring, and the convex portions 60f, 60h, 60f protrude from the base portion 60m. The outer peripheral surface 60b included in the base portion 60m is configured to be spaced from the cylindrical surface 10c of the housing 10, the first surface 60c included in the base portion 60m is configured to be spaced from the second outer surface 21b of the motor 20, and the second surface 60d included in the base portion 60m is configured to be spaced from the second inner surface 10b of the housing 10.

Also, the elastic member 60 is configured such that the entire shape of the elastic member 60, including a shape of the first surface 60c and a shape of the second surface 60d, is symmetric with respect to a plane, which is located between the first surface 60c and the second surface 60d and is perpendicular to the axial direction of the rotation center Ax1.

The elastic member 60 according to the above configurations is sandwiched between the second outer surface 21b of the motor case 21 and the second inner surface 10b of the housing 10 in a state where the convex portions 60h, 60j are elastically compressed. Due to an elastic force of the elastic member 60 in this state, the motor 20 is pressed against the inner cover 12, so that the motor 20 is positioned in place. Additionally, the convex portions 60f may also be in an elastically compressed state.

For the electric-powered brake motor unit 100 according to the above configurations, for example, an airtightness test is performed. The airtightness test is intended to check airtightness of the housing 10 and is performed, for example, in such a manner to suck out air in the housing 10 through a predetermined opening of the housing 10 within a prescribed test time. At this time, for example, if an air suction amount per unit time (flow rate) at a time when the prescribed test time has elapsed is equal to or less than a threshold, it is determined to be normal, whereas if the air suction amount per unit time (flow rate) at the time when the prescribed test time has elapsed is larger than the threshold, it is determined to be abnormal. By securing the airtightness of the housing 10, dusts or water can be suppressed from entering the housing 10. For the airtightness test, in the present embodiment, air between the bottom portion of the housing portion 11a and the elastic member 60 (including air in the recessed portion 10d) is sucked out of the housing 10 through at least the concave portions 60g, 60k and then through the opening end 11b of the housing portion 11a. Also, air between the motor case 21 and the elastic member 60 is sucked out of the housing 10 through the concave portions 60i and then through the opening end 11b of the housing portion 11a. The recessed portion 10d is one example of an air reservoir where air is collected.

As described above, in the present embodiment, for example, the concave portion 60g (first concave portion) is provided between the outer peripheral surface 60b of the elastic member 60 and the cylindrical surface 10c of the housing 10 to lead to opposing sides of the elastic member 60 in the axial direction of the rotation center Ax1. Therefore, according to this configuration, air can pass between the outer peripheral surface 60b of the elastic member 60 and the cylindrical surface 10c of the housing 10 by passing through the concave portion 60g, thereby enhancing flowability of air between the outer peripheral surface 60b of the elastic member 60 and the housing 10. As a result, a work efficiency of the airtightness test described above is enhanced. Also, since flowability of air in the housing 10 is enhanced, heat dissipation is enhanced by convection of the air.

Also, in the present embodiment, the elastic member 60 is provided with a plurality of convex portions 60f, 60j coming in close contact with the housing 10 and a plurality of convex portions 60h coming in close contact with the motor 20. Therefore, according to this configuration, a balance between securing of elasticity of the elastic member 60 suitable for vibration-damping or the like and enhancing of flowability of air (dischargeability) as described above can be achieved.

Further, in the present embodiment, the outer peripheral surface 60b of the elastic member 60 is provided with the concave portions 60g, whereas the inner peripheral surface 60a is not provided with concave portions. One reason for this is that an area of the outer peripheral surface 60b is larger than that of the inner peripheral surface 60a and thus a contact area between the outer peripheral surface 60b and the cylindrical surface 10c of the housing 10 is easier to secure than a contact area between the inner peripheral surface 60a and the protrusion portion 21d of the motor 20.

Further, in the present embodiment, for example, a plurality of concave portions 60g are provided to be spaced from each other in the circumferential direction about the rotation center Ax1. Therefore, according to this configuration, air can pass between the outer peripheral surface 60b of the elastic member 60 and the cylindrical surface 10c of the housing 10 by passing through the plurality of concave portions 60g, thereby further enhancing flowability of air between the outer peripheral surface 60b of the elastic member 60 and the housing 10.

Further, in the present embodiment, for example, the concave portion 60i, 60k (second concave portion) for communicating the side of the inner peripheral surface 60a of the elastic member 60 with the side of the outer peripheral surface 60b of the elastic member 60 is provided on at least one (both as one example) of between the second outer surface 21b and the first surface 60c and between the second inner surface 10b and the second surface 60d. According to this configuration, for example, air can flow between the side of the inner peripheral surface 60a of the elastic member 60 and the side of the outer peripheral surface 60b of the elastic member 60 through the concave portion 60i, 60k, thereby enhancing flowability of air in the housing 10.

Further, in the present embodiment, for example, the inner peripheral surface 60a and the outer peripheral surface 60b are configured to have a cylindrical shape about the rotation center Ax1. Also, the elastic member 60 has a plurality of convex portions 60h, 60h on at least one (both as one example) of the first surface 60c as a contact surface and the second surface 60d as a contact surface, and the plurality of convex portions 60h, 60j are provided to be spaced from each other in the circumferential direction of the outer peripheral surface 60b and to extend in the circumferential direction. The top portions 60ha, 60ja of the convex portions 60h, 60j are in contact with one of the second outer surface 21b and the second inner surface 10b, which the corresponding contact surface provided with the convex portions 60h, 60j faces. The concave portions 60i, 60k are provided between two convex portions 60h, 60j adjacent to each other in the circumferential direction. According to this configuration, since the plurality of convex portions 60h, 60j of the elastic member 60 extend in the circumferential direction, it is easy to suppress deformation of the convex portions 60h, 60j, even if a torque about the rotation center Ax1 is exerted on the convex portions 60h, 60j via the housing 10 as the shaft 22 of the motor 20 rotates, thereby enhancing durability of the convex portions 60h, 60j. This makes it easy to lower a height of the convex portions 60h, 60j.

Further, in the present embodiment, for example, the concave portions 60g and the concave portions 60i are provided on the elastic member 60. Further, as viewed in the axial direction, the concave portions 60g and the concave portions 60i are positioned to be offset from each other in the circumferential direction. According to this configuration, a problem that strength of the elastic member 60 is locally decreased is easily avoided, as compared with a configuration in which the concave portions 60g and the concave portions 60i are not offset from each other in the circumferential direction.

Further, in the present embodiment, for example, the concave portions 60i, 60k are provided on the first surface 60c and the second surface 60d, respectively. According to this configuration, for example, flowability of air is enhanced on each of the side of the first surface 60c of the elastic member 60 and the side of the second surface 60d of the elastic member 60.

Further, in the present embodiment, the inner peripheral surface 60a is in contact with the protrusion portion 21d over the entire periphery of the inner peripheral surface 60a. According to this configuration, for example, a supporting function of the elastic member 60 on the motor 20 is enhanced as compared with a configuration in which the inner peripheral surface 60a is partially in contact with the protrusion portion 21d in the circumferential direction. Further, a local deformation of the elastic member 60 is suppressed, thereby enhancing durability of the elastic member 60.

Further, in the present embodiment, the elastic member 60 is configured such that the entire shape of the elastic member 60, including a shape of the first surface 60c and a shape of the second surface 60d, is symmetric with respect to a plane, which is located between the first surface 60c and the second surface 60d and is perpendicular to the axial direction of the rotation center Ax1. Therefore, the elastic member 60 can be assembled even in an assembling posture of the elastic member 60, in which the first surface 60c and the second surface 60d are turned upside down. That is, restrictions on a direction of assembling the elastic member 60 are reduced. As a result, assemblability of the elastic member 60 is enhanced as compared with a configuration in which the shape of the elastic member 60 is asymmetric with respect to a plane, which is located between the first surface 60c and the second surface 60d and is perpendicular to the axial direction of the rotation center Ax1.

Further, in the present embodiment, the convex portions 60h, 60j are provided on the elastic member 60. Accordingly, it is possible to relatively easily set a spring constant of the elastic member 60 by adjusting a width or height of the convex portions 60h, 60j in a design step.

Figure 6:
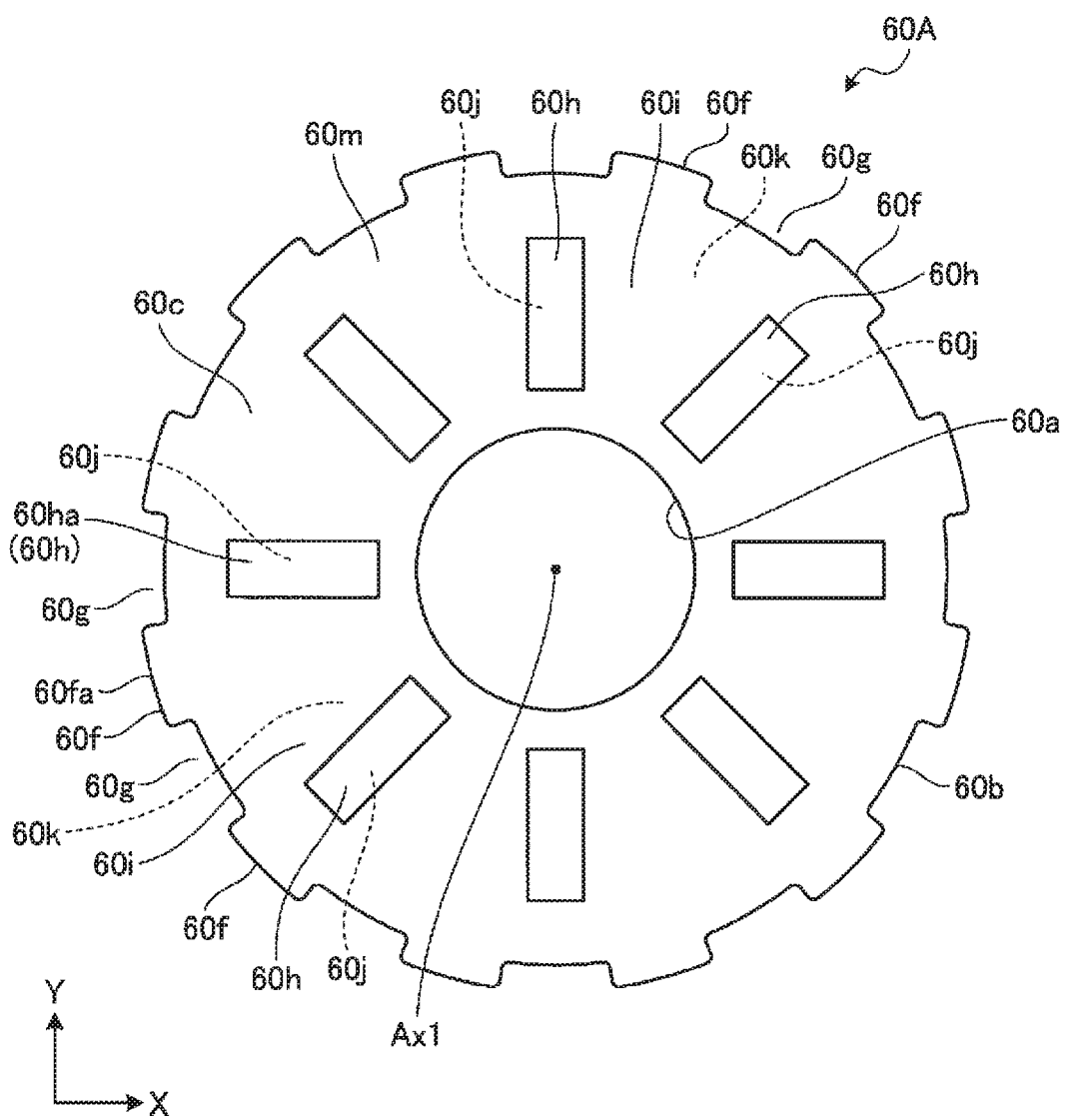
FIG. 6 is a schematic and exemplary plan view of an elastic member of an electric-powered brake motor unit according to a first variant of the embodiment.
Figure 7:
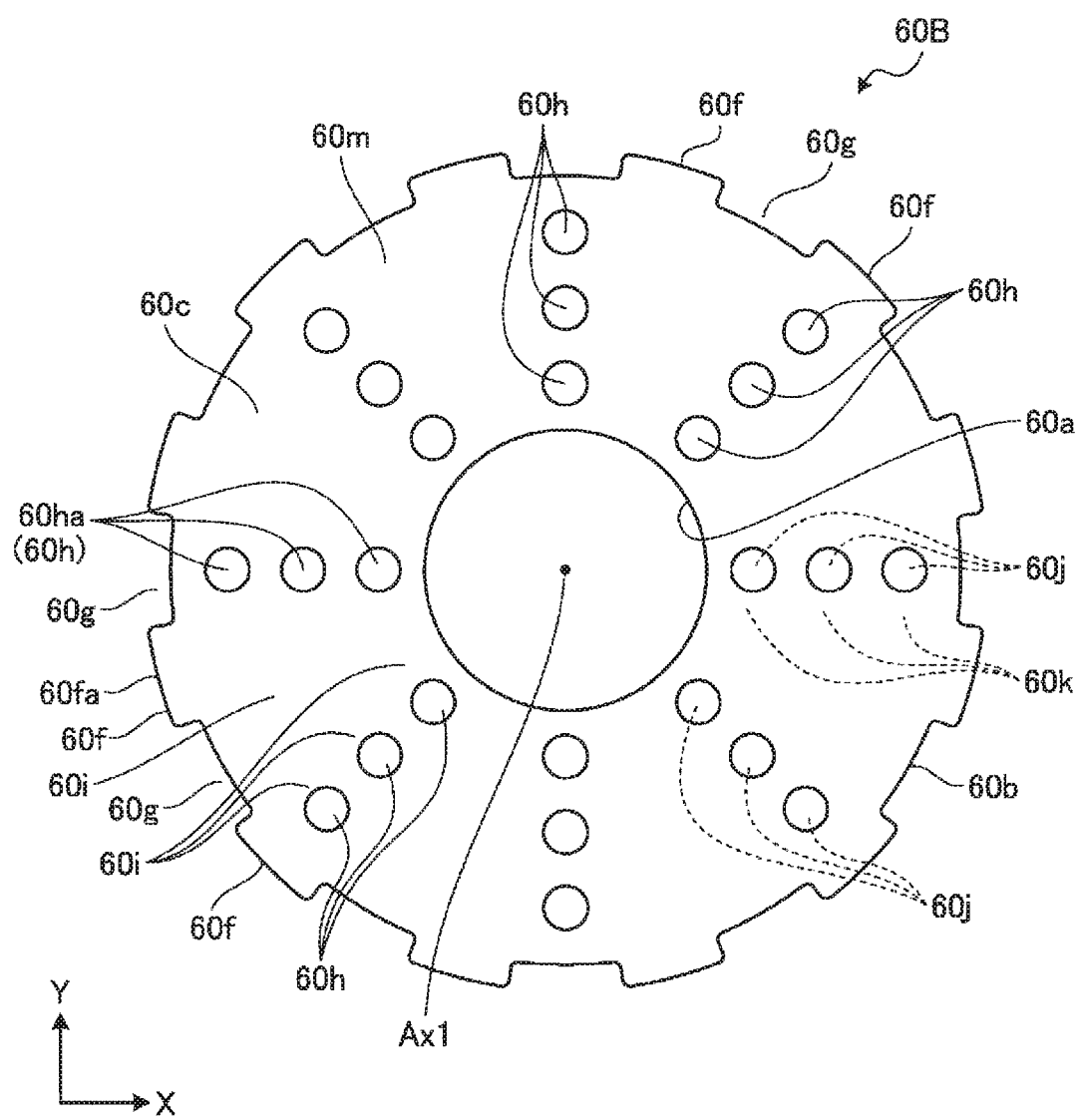
FIG. 7 is a schematic and exemplary plan view of an elastic member of an electric-powered brake motor unit according to a second variant of the embodiment.

Next, variants of the present embodiment will be described. FIG. 6 is a schematic and exemplary plan view of an elastic member 60A according to a first variant. FIG. 7 is a schematic and exemplary plan view of an elastic member 60B according to a second variant.

In the elastic member 60A according to the first variant shown in FIG. 6, convex portions 60h are provided in a radial shape about the rotation center Ax1. Further, concave portions 60i are provided between the convex portions 60h adjacent to each other in the circumferential direction. In addition, convex portions 60j are also configured in a radial shape about the rotation center Ax1, and concave portions 60k are provided between the convex portions 60j adjacent to each other in the circumferential direction. According to this configuration, a force inputted to the elastic member 60A from the motor 20 can be easily dispersed.

In the elastic member 60B according to the second variant shown in FIG. 7, convex portions 60h are configured in the form of a column (circular column as one example). Further, concave portions 60i are provided between the convex portions 60h adjacent to each other in the circumferential direction. In addition, convex portions 60j are also configured in the form of a column, and concave portions 60k are provided between the convex portions 60j adjacent to each other in the circumferential direction.

Meanwhile, although in the foregoing embodiment, the convex portions 60f and the concave portions 60g are provided on the outer peripheral surface 60b of the elastic member 60, the present invention is not limited thereto. For example, convex portions and concave portions may be provided on the cylindrical surface 10c of the housing 10. Also, although in the foregoing embodiment, the convex portions 60h and the concave portions 60i are provided on the first surface 60c of the elastic member 60, the present invention is not limited thereto. For example, convex portions and concave portions may be provided on the second outer surface 21b of the motor case 21 of the motor 20. Further, although in the foregoing embodiment, the convex portions 60j and the concave portions 60k are provided on the second surface 60d of the elastic member 60, the present invention is not limited thereto. For example, convex portions and concave portions may be provided on the second inner surface 10b of the housing 10.

Although the embodiments of the present invention have been illustrated in the foregoing, the embodiments are only examples and are not intended to limit the scope of the invention. The embodiments can be implemented in various other modes, and also various omissions, substitutions, combinations and changes therein can be made without departing from the spirit and scope of the invention. Also, configurations thereof or specifications, such as shape (structure, type, direction, shape, size, length, width, thickness, height, number, arrangement, position, material and the like) can be appropriately changed and implemented.

For example, in a case where the electric-powered brake motor unit 100 described in the foregoing embodiment is applied to an electric-powered drum brake, a shoe (frictional material) of the drum brake may be configured to be driven by rotation of the output shaft 46 of the planetary gear mechanism 42 (reduction mechanism 40).

Also, for example, the electric-powered brake motor unit 100 of the present invention can be applied not only to an electric-powered parking brake but also to an electric-powered service brake.

The invention claimed is:

1. A motor device, comprising:
a motor having a motor case and a shaft supported by the motor case to be rotatable about a rotation center;
a housing that houses the motor; and
an elastic member interposed between the motor case and the housing, wherein
the motor case has a first outer surface, a second outer surface positioned to be spaced from the first outer surface in an axial direction of the rotation center, and a protrusion portion provided on the second outer surface,
the housing has a first inner surface facing the first outer surface, a second inner surface facing the second outer surface, and a cylindrical surface provided between the first inner surface and the second inner surface and configured to surround the motor case,
the elastic member has a cylindrical inner peripheral surface configured to allow the protrusion portion of the motor to be fitted therein and thus to come in contact therewith, a cylindrical outer peripheral portion configured to be in contact with the cylindrical surface, a first surface provided to extend from the inner peripheral surface to the outer peripheral surface and configured to be in contact with the second outer surface, and a second surface provided to extend from the inner peripheral surface to the outer peripheral surface and configured to be in contact with the second inner surface, and the elastic member is configured to urge the motor case toward the first inner surface, and
a first concave portion is provided between the outer peripheral surface and the cylindrical surface to lead to opposing sides of the elastic member in the axial direction of the rotation center.

2. The motor device according to claim 1, wherein
a plurality of first concave portions are provided to be spaced from each other in a circumferential direction about the rotation center.

3. The motor device according to claim 1, wherein
a second concave portion for communicating the side of the inner peripheral surface of the elastic member with the side of the outer peripheral surface of the elastic member is provided on at least one of between the second outer surface and the first surface and between the second inner surface and the second surface.

4. The motor device according to claim 3, wherein
the inner peripheral surface and the outer peripheral surface are configured to have a cylindrical shape about the rotation center,
the elastic member has a plurality of convex portions on at least one of the first surface as a contact surface and the second surface as a contact surface, wherein the plurality of convex portions are provided to be spaced from each other in a circumferential direction of the outer peripheral surface and to extend in the circumferential direction,
top portions of the convex portions are in contact with one of the second outer surface and the second inner surface, which the corresponding contact surface provided with the convex portions faces, and
the second concave portion is provided between two convex portions of the elastic member adjacent to each other in the circumferential direction.

5. The motor device according to claim 4, wherein
the first concave portion and the second concave portion are provided on the elastic member, and
as viewed in the axial direction, the first concave portion and the second concave portion are positioned to be offset from each other in the circumferential direction.

6. The motor device according to claim 3, wherein
the second concave portion is provided on each of the first surface and the second surface.

7. The motor device according to claim 1, wherein
the inner peripheral surface is in contact with the protrusion portion of the motor over the entire periphery of the inner peripheral surface.

8. The motor device according to claim 2, wherein
a second concave portion for communicating the side of the inner peripheral surface of the elastic member with the side of the outer peripheral surface of the elastic member is provided on at least one of between the second outer surface and the first surface and between the second inner surface and the second surface.

9. The motor device according to claim 4, wherein
the second concave portion is provided on each of the first surface and the second surface.

10. The motor device according to claim 5, wherein
the second concave portion is provided on each of the first surface and the second surface.

11. The motor device according to claim 2, wherein
the inner peripheral surface is in contact with the protrusion portion of the motor over the entire periphery of the inner peripheral surface.

12. The motor device according to claim 3, wherein
the inner peripheral surface is in contact with the protrusion portion of the motor over the entire periphery of the inner peripheral surface.

13. The motor device according to claim 4, wherein
the inner peripheral surface is in contact with the protrusion portion of the motor over the entire periphery of the inner peripheral surface.

14. The motor device according to claim 5, wherein
the inner peripheral surface is in contact with the protrusion portion of the motor over the entire periphery of the inner peripheral surface.

15. The motor device according to claim 6, wherein
the inner peripheral surface is in contact with the protrusion portion of the motor over the entire periphery of the inner peripheral surface.

16. The motor device according to claim 8, wherein
the inner peripheral surface and the outer peripheral surface are configured to have a cylindrical shape about the rotation center,
the elastic member has a plurality of convex portions on at least one of the first surface as a contact surface and the second surface as a contact surface, wherein the plurality of convex portions are provided to be spaced from each other in a circumferential direction of the outer peripheral surface and to extend in the circumferential direction, top portions of the convex portions are in contact with one of the second outer surface and the second inner surface, which the corresponding contact surface provided with the convex portions faces, and the second concave portion is provided between two convex portions of the elastic member adjacent to each other in the circumferential direction.

17. The motor device according to claim 16, wherein the first concave portion and the second concave portion are provided on the elastic member, and as viewed in the axial direction, the first concave portion and the second concave portion are positioned to be offset from each other in the circumferential direction.

18. The motor device according to claim 8, wherein the second concave portion is provided on each of the first surface and the second surface.

19. The motor device according to claim 16, wherein the second concave portion is provided on each of the first surface and the second surface.

20. The motor device according to claim 17, wherein the second concave portion is provided on each of the first surface and the second surface.

* * * * *